United States Patent
Sugawara et al.

(10) Patent No.: US 7,067,085 B1
(45) Date of Patent: Jun. 27, 2006

(54) BLACK CERAMIC SINTER WITH LOW THERMAL EXPANSION AND HIGH SPECIFIC RIGIDITY AND PROCESS FOR PRODUCING THE SAME

(75) Inventors: Jun Sugawara, Kitakyushu (JP); Hidehiko Morita, Tokyo (JP); Katsumi Hashimoto, Toyko (JP); Tetsuro Nose, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 131 days.

(21) Appl. No.: 10/019,752

(22) PCT Filed: Jun. 1, 2000

(86) PCT No.: PCT/JP00/03566

§ 371 (c)(1),
(2), (4) Date: Dec. 27, 2001

(87) PCT Pub. No.: WO01/00540

PCT Pub. Date: Apr. 1, 2001

(30) Foreign Application Priority Data

Jun. 29, 1999 (JP) .................. 11-183109

(51) Int. Cl.
*C04B 35/00* (2006.01)

(52) U.S. Cl. ............... 264/676; 501/503; 501/55; 501/118

(58) Field of Classification Search ........... 264/674, 264/676; 501/118, 53, 55
See application file for complete search history.

(56) References Cited

U.S. PATENT DOCUMENTS 6,265,334 B1   7/2001  Sechi et al. .............. 501/9
6,372,677 B1 * 4/2002  Nose et al. .............. 501/119

FOREIGN PATENT DOCUMENTS

| | | |
|---|---|---|
| DE | 198 49 340 | 4/1999 |
| EP | 1 094 046 | 4/2001 |
| JP | 57-38371 | 3/1982 |
| JP | 57-29436 | 6/1982 |
| JP | 61-72679 | 4/1986 |
| JP | 63-210060 | 8/1988 |
| JP | 402074538 | * 3/1990 |
| JP | 403150263 | * 6/1991 |
| JP | 4-50161 | 2/1992 |
| JP | 6-172034 | 6/1994 |
| JP | 8-310860 | 11/1996 |
| JP | 10-53460 | 2/1998 |
| JP | 11-343168 | 12/1999 |
| JP | 2000-290064 | 10/2000 |
| JP | P3133302 | 11/2000 |

OTHER PUBLICATIONS

*Collected Catalogs of Fine Ceramics*, "Low Thermal Expansion Ceramics", Japan Fine Ceramics Society, 1987, p. 140, and English translation.
*Ceramics*, vol. 18 (1983) No. 5, "Ceramic Pigments", p. 377, by A. Ohtsuka, and partial English translation.
Data Base WPI Abstract of Japan No. 61-178038 published Aug. 9, 1986.

* cited by examiner

*Primary Examiner*—Sean Vincent
*Assistant Examiner*—Carlos Lopez
(74) *Attorney, Agent, or Firm*—Kenyon & Kenyon LLP

(57) ABSTRACT

This invention provides a black low thermal expansion high specific rigidity ceramic sintered body having a black tone, manifesting very small thermal expansion at room temperature and abounding in rigidity and specific rigidity, and a method for the production thereof. The black low thermal expansion high specific rigidity ceramic sintered body is characterized by having a chemical composition comprising 8.0–17.2 mass % of MgO, 22.0–38.0 mass % of $Al_2O_3$, 49.5–65.0 mass % of $SiO_2$, a total of 0.1–2 mass % of one or more transition elements as reduced to oxides, and 0–2.5 mass % of $Li_2O$, and having the mass ratios satisfy the relationships of $(SiO_2-8\times Li_2O)/MgO \geq 3.0$ and $(SiO_2-8\times Li_2O)/Al_2O_3 \geq 1.2$. The method for the production of a black low thermal expansion high specific rigidity ceramic sintered body of this invention is characterized by forming the sintered body in an atmosphere of a non-oxidizing gas at a temperature in the range of 1200–1500° C.

8 Claims, No Drawings

BLACK CERAMIC SINTER WITH LOW THERMAL EXPANSION AND HIGH SPECIFIC RIGIDITY AND PROCESS FOR PRODUCING THE SAME

TECHNICAL FIELD

This invention relates to a black low thermal expansion high specific rigidity ceramic sintered body possessing a black tone, manifesting very small thermal expansion at room temperature, and abounding in rigidity and specific rigidity, and to a method for the production thereof. More particularly, this invention relates to a black low thermal expansion high specific rigidity ceramic sintered body for the use in members including production units (such as an exposure meter, a processing machine, and construction machine) for semiconductors and magnetic heads which abhor such phenomena as thermal deformation of a device caused by fluctuation of an ambient temperature or emission of heat from the device itself and unnecessary reflection (including irregular reflection) or transmission of light and measuring devices, and to a method for the production thereof.

BACKGROUND ART

Recently, owing to the trend of semiconductors toward higher integration and magnetic heads toward further miniaturization, the production units (such as an exposure meter, a processing machine, and a construction machine) for such semiconductors and magnetic heads, measuring devices, measuring prototypes, and reflecting mirrors have reached the point of requiring high dimensional accuracy and high rigidity. For these devices, the stability of dimensional accuracy has also come to gain insignificance. The prevention of such devices from incurring the deformation which is caused by the fluctuation of an ambient temperature or the emission of heat from the device itself has become an important task. The materials which produce very small thermal expansions and abound in rigidity and specific rigidity (Young's modulus/specific gravity) have come to find the use for component members in such devices.

The various devices as mentioned above are mostly aimed at handling the lights such as laser beam, ultraviolet light, and visible ray for the purpose of exposure or measurement. The members which are used in these devices more often than not abhor unnecessary reflection (including irregular reflection) or transmission of light. On many occasions, black materials which succumb only sparingly to reflection and transmission of light are found as necessary supplies.

The low thermal expansion materials which have heretofore known in the art include Invar alloy (Fe—Ni type) and super-Invar alloy (Fe—Ni—Co type) in the class of metals, such low thermal expansion glasses as ZERODUR™ glass (available from Schott ML GmbH in Germany), quartz glass ($SiO_2$), and titanium dioxide-containing quartz glass ($SiO_2$—$TiO_2$) in the class of ceramics, aluminum titanate ($TiO_2$—$Al_2O_3$), cordierite (MgO—$Al_2O_3$—$SiO_2$) type sintered body and glass, lithium-alumino-silicate ($Li_2O$—$Al_2O_3$—$SiO_2$) type sintered body and glass.

The super-Invar alloy as a low thermal expansion metal indeed manifests such a low thermal expansion coefficient as $0.13 \times 10^{-6}$/° C. at room temperature and yet has such a large specific gravity as 8.2 g/cm$^2$ and such a not very high Young's modulus as 125 GPa. Thus, it has a very low specific rigidity approximately of 15 GPa cm$^3$/g and, therefore, is deficient in mechanical stability. The term "specific rigidity" as used herein means a magnitude obtained by dividing a Young's modulus (E) by a specific gravity ($\rho$) (specific rigidity=E/$\rho$). The impartation of the black color to the surface of this alloy has no alternative but to rely on the method of using such a surface coat as a black Cr plating on the surface layer. The use of the surface coat, however, entails the problem of exerting adverse effects on the low thermal expansion property and the precision machining property.

The quartz glass, while enjoying such a low thermal expansion coefficient as $0.48 \times 10^{-6}$/° C., suffers from such an insufficient specific rigidity as about 33 GPa cm$^3$/g and a clear tone.

The ZERODUR™ glass has been finding the extensive utility in applications to such devices as measuring prototypes. It enjoys such a sufficiently low thermal expansion coefficient as $0.02 \times 10^{-6}$/° C. at room temperature and yet suffers from a clear tone. It further encounters difficulty in forming products too complicate in shape and products too large in size to manufacture. Further, since it manifests specific rigidity and Young's modulus respectively approximating 35.6 GPa·cm$^3$/g and 90 GPa, it does not fully fit the use aimed at by this invention.

As regards the aluminum titanate, it has been known to have produced a sintered body manifesting such a low thermal expansion coefficient as $-0.068 \times 10^{-6}$/° C. ("Glossary of Fine Ceramics Catalogs (1987)", p. 140). This compound manifests such a high water absorption as 1.59% and thus offers only insufficient denseness for the use aimed at by this invention. No sintered bodies of this compound has been known to possess a black tone.

The lithium-alumino-silicate type sintered body and glass are deficient in mechanical stability because it manifests only such insufficiently high specific rigidity as not more than 33 GPa·cm$^3$/g in spite of such a small thermal expansion coefficient as falls in the range of −5 to $1 \times 10^{-6}$/° C. It has predominantly acquired a white tone and has not acquired a black tone so far.

JP-A-61-72, 679 discloses a low thermal expansion ceramic sintered body which has a chemical composition mainly comprising 0.3–5.5 mass % of $Li_2O$, 4.1–16.4 mass % of MgO, 2.07–42.8 mass % of $Al_2O_3$, and 46.3–70.1 mass % of $SiO_2$, a crystal phase containing not less than 30 mass % of cordierite and not less than 5 mass % of β-spodumene as main components, and manifests a thermal expansion coefficient of $2.0 \times 10^{-6}$/° C. at a temperature in the range of 20° C.–800° C. This publication, however, has absolutely no mention of the tone of the sintered body and points out the fact that the sintered body produced by the method taught in the publication does not acquire a black tone (refer to Comparative Example 22 in Table 1 inserted in the working example which will be specifically described hereinbelow).

JP-A-10-53,460 reports a dense ceramic substance which comprises 1.5–6.5 mass % of $Li_2O$, 1.0–10 mass % of MgO, 14–30 mass % of $Al_2O_3$, and 58–83 mass % of $SiO_2$, and allows the coexistence of petalite, spodumene, and cordierite in a crystal phase and demonstrates that this substance excels in resistance to thermal shock. This publication, however, has absolutely no mention of the tone of the ceramic and points out the fact that the sintered body produced by the method taught in the publication does not acquire a black tone (refer to Comparative Example 23 in Table 1 inserted in the working example which will be specifically described hereinbelow).

"Ceramics", Vol. 18 (1983) No. 5 discloses a Co—Cr—Fe type spinel, a Co—Mn—Fe type spinel, a Co—Mn—Cr—Fe type spinel, a Co—Ni—Cr—Fe type spinel, and a Co—Ni—Mn—Cr—Fe type spinel as black pigments for the use in coloring ceramics and also discloses a solid solution of Sb in $SiO_2$ and a solid solution of Co and Ni in $ZrSiO_4$ as gray pigments. These pigments, however, are intended to utilize the phenomenon of coloration in the graze on the surface of ceramics and not to impart a black color to a depth in the sintered body itself. Any attempt to use the graze on the surface of a low thermal expansion ceramic substance proves futile because the difference in thermal expansion between the ceramic substance and the graze tends to inflict a crack to the applied layer of the graze.

The silicon carbide sintered body has been commercially available as a black ceramic substance. JP-A-08-310,860 discloses a black zirconia ceramic sintered body, JP-A-04-50,161 a method for the production of a high rigidity black alumina sintered body, and JP-A-06-172,034 a black silicon nitride sintered body, respectively. Though these sintered bodies are black, their thermal expansion coefficients at room temperature are $2.3 \times 10^{-6}/°$ C. in the sintered body of silicon carbide, $7 \times 10^{-6}/°$ C. in that of zirconia, $5.3 \times 10^{-6}/°$ C. in that of alumina, and $1.3 \times 10^{-6}/°$ C. in that of silicon nitride. Thus, these sintered bodies are incapable of realizing a low thermal expansion coefficient aimed at this invention.

Incidentally, the term "room temperature" as used in this invention refers to the range of temperatures, 20° C.–25° C. The room temperature mentioned in the present specification invariably refers to $_{this}$ temperature range.

JP-B-57-29,436 discloses a technique which comprises adding to a cordierite sintered body an oxide of such a transition element as Zn, V, Nb, Cr, Mo, or W for the purpose of densifying the sintered body. The sintered body obtained by this technique, however, manifests such an insufficiently low thermal expansion coefficient as $0.96 \times 10^{-6}/°$ C., fails to acquire sufficient densification as evident from water absorption of 4.6%, and suffers from not sufficiently high rigidity. The publication has absolutely no mention of the tone.

Recently, JP-A-11-343,168 discloses a technique for the impartation of a black color to a ceramic substance containing not less than 80 mass % of cordierite by the incorporation of 0.1–2.0 mass % of carbon into the ceramic substance.

The invention disclosed in this publication is characterized by incorporating carbon and, therefore, is different from the present invention which does not need the incorporation of carbon.

The incorporation of carbon in a sintered body entails the problem of heightening the thermal expansion coefficient as indicated in the above publication, exerts such an adverse effect on mechanical properties as lowering the modulus of elasticity, renders the formation of products large in wall thickness and size difficult to attain by sintering, and inevitably imposes restrictions on the shapes of such products. Thus, the incorporation of carbon proves unfavorable.

The material which contains no carbon, assumes a black color, manifests low thermal expansion, and possesses rigidity and specific rigidity high enough to ensure effective use as building materials has not been known to date.

This invention is aimed at providing a black low thermal expansion ceramic sintered body which assumes a black tone and manifests very low thermal expansion and high rigidity and specific rigidity at room temperature and a method for the production thereof.

DISCLOSURE OF THE INVENTION

To be specific, this invention is featured by the following items.
(1) A black low thermal expansion high specific rigidity ceramic sintered body, characterized by having a thermal expansion coefficient of not more than $0.6 \times 10^{-6}/°$ C. in absolute value at room temperature, a modulus of elasticity (Young's modulus) of not less than 100 GPa, and specific rigidity (Young's modulus/specific gravity) of not less than 40 GPa·cm³/g and assuming a black tone.
(2) A black low thermal expansion high specific rigidity ceramic sintered body, characterized by having a chemical composition comprising 8.0–17.2 mass % of MgO, 22.0–38.0 mass % of $Al_2O_3$, 49.5–65.0 mass % of $SiO_2$, a total of 0.1–2 mass % of one or more transition elements as reduced to oxides, and 0–2.5 mass % of $Li_2O$, and having the mass ratios satisfy the relationships of $(SiO_2-8 \times Li_2O)/MgO \geq 3.0$ and $(SiO_2-8 \times Li_2O)/Al_2O_3 \geq 1.2$.
(3) A black low thermal expansion high specific rigidity ceramic sintered body according to the item (2), wherein the thermal expansion coefficient is not more than $0.6 \times 10^{-6}/°$ C. in absolute value at room temperature, the modulus of elasticity (Young's modulus) is not less than 100 GPa, and the specific rigidity (Young's modulus/specific gravity) is not less than 40 GPa·cm³/g and the tone of the sintered body is black.
(4) A black low thermal expansion high specific rigidity ceramic sintered body according to any one of the items (1) through (3), wherein the total reflectivity of the sintered body is not more than 17% at a wavelength of light in the range of 200–950 nm.
(5) A black low thermal expansion high specific rigidity ceramic sintered body according to any one of the items (1) through (4), wherein the apparent porosity of the sintered body is not more than 2%.
(6) A black low thermal expansion high specific rigidity ceramic sintered body according to any one of the items (1) through (5), wherein not less than 80 vol. % of the crystal phase of the sintered body is a crystal phase of cordierite.
(7) A black low thermal expansion high specific rigidity ceramic sintered body according to any one of the items (1) and (3) through (6), wherein the thermal expansion coefficient is not more than $0.3 \times 10^{-6}/°$ c. in absolute value at room temperature.
(8) A black low thermal expansion high specific rigidity ceramic sintered body according to any one of the items (1) and (3) through (7), wherein the modulus of elasticity is not less than 120 GPa and the specific rigidity is not less than 50 GPa·cm³/g.
(9) A black low thermal expansion high specific rigidity ceramic sintered body according to any one of the items (2) through (8), wherein the chemical composition has such mass ratios as satisfy the relationships of $(SiO_2-8 \times Li_2O)/MgO \geq 3.65$ and $(SiO_2-8 \times Li_2O)/Al_2O_3 \geq 1.3$.
(10) A method for the production of a black low thermal expansion high specific rigidity ceramic sintered body, characterized by forming the sintered body in an atmosphere of a non-oxidizing gas at a temperature in the range of 1200–1500° C.
(11) A method for the production of a black low thermal expansion high specific rigidity ceramic sintered body set forth in any one of the items (2) through (9), wherein the sintered body is formed in an atmosphere of a non-oxidizing gas at a temperature in the range of 1200–1500° C.

(12) A method for the production of a black low thermal expansion high specific rigidity ceramic sintered body according to in the item (10) or (11), wherein the non-oxidizing gas is one or more members selected among argon, helium, nitrogen and hydrogen.

(13) A method for the production of a black low thermal expansion high specific rigidity ceramic sintered body according to any one of the items (10) through (12), wherein the raw material powder is one or more members selected from the group consisting of cordierite powder, talc, magnesia spinel, magnesia, magnesium hydroxide, magnesium carbonate, $Li_2O$—$Al_2O_3$—$SiO_2$ type powders (petalite, spodumene, and eucriptite), lithium hydroxide, lithium carbonate, alumina powder, silica powder, kaolin powder, and mullite powder.

(14) A method for the production of a black low thermal expansion high specific rigidity ceramic sintered body according to the item (13), wherein not less than 70 mass % of the MgO component as the MgO-source raw material is supplied by one or more members selected from the group consisting of electro-molten cordierite powder, synthetic cordierite powder, and talc powder.

(15) A method for the production of a black low thermal expansion high specific rigidity ceramic sintered body according to any one of the items (10) through (14), wherein the sintering method is a hot press method, an HIP method, a gas pressure sintering method, or a normal pressure sintering method.

The sintered body of this invention can, by having a chemical composition mainly comprise 8.0–17.2 mass % of MgO, 22.0–38.0 mass % of $Al_2O_3$, and 49.5–65.0 mass % of $SiO_2$ and consequently forming a crystal composition mainly as a cordierite crystal phase, obtain a low thermal expansion coefficient and a high specific rigidity which are aimed at by this invention.

When the acquisition of the low thermal expansion coefficient at room temperature is not aimed at as in the present invention, $Li_2O$ does not constitute itself an essential component. The incorporation of $Li_2O$, however, may bring about such effects as enhancing the sintering properties, facilitating the formation of a dense sintered body, allowing the activation of the reaction (mass transfer) in the sintered body in the process of formation to start at a relatively low temperature, enabling the impartation of a black color to start at a still lower temperature, and causing the finally produced sintered body to be further blackened.

The sintered body of this invention can, by incorporating a total of 0.1–2 mass % of one or more transition elements as reduced to oxides, having the mass ratios in a chemical composition satisfy the relationship: $X=(SiO_2-8\times Li_2O)/MgO \geq 3.0$ and $Y=(SiO_2-8\times Li_2O)/Al_2O_3 \geq 1.2$, and effecting the sintering process in an atmosphere of a non-oxidizing gas at a temperature in the range of 1200–1500° C., acquire a black tone which is aimed at by this invention.

BEST MODE OF EMBODYING THE INVENTION

For the quantitative determination about whether a given sintered body has a black tone or not, a method which relies on the color difference found with a calorimeter to attain the expected expression or a method which utilizes the total reflectivity specified in JIS K7105 may be adopted. The applications to be found for the sintered body of this invention are such that they abhor the reflection of light including irregular reflection and, therefore, are most appropriately rated for the degree of this abhorrence by utilizing the total reflectivity. The total reflectivity is attained by combined determination of direct reflection and diffused reflection with the aid of a globular integrating sphere. The determination in this case is made in accordance with JIS K7105.

Generally, for such members used in devices handling a laser beam or an ultraviolet light and requiring a black tone, products plated with black chrome and products treated with black alumite may be adopted. The total reflectivity in the products plated with black chrome is in the range of 5–7% at a wavelength of light in the range of 200–950 nm and in the products treated with black alumite in the range of 6–8% at a wavelength of light in the range of 200–650 nm or in the range of 10–60% at a wavelength of light in the range of 700–950 nm. The total reflectivity is preferred to be as low as permissible because the degree with which the reflection is prevented is heightened in proportion as the total reflectivity is lowered. Generally, so long as the total reflectivity is not more than 17% within the range, 200–950 nm, of wavelength of light, members for such devices as abhorring the reflection of light can be safely used from the practical point of view. Better results can be obtained when the total reflectivity is not more than 12%.

In this invention, the sintered body of a black tone which is aimed at by this invention is characterized by having incorporated therein as a coloring auxiliary one or more transition elements in a total amount of 0.1–2 mass % as reduced to oxides, having the mass ratios of the chemical composition satisfy the relationship: $X=(SiO_2-8\times Li_2O)/Mgo \geq 3.0$ and $Y=(SiO_2-8\times Li_2O)/Al_2O_3 \geq 1.2$, and performing the sintering process in an atmosphere of a non-oxidizing gas at a temperature in the range of 1200–1500° C. The fulfillment of all these requirements enables the total reflectivity of the sintered body to fall in the range contemplated by this invention.

No fully satisfactory black tone can be obtained when the total amount of transition elements as coloring auxiliary is not more than 0.1 mass % as reduced to oxides. If the total amount is not less than 2 mass %, the excess would be at a disadvantage in compelling the produced sintered body to form a low melting compound therein and giving rise to a phenomenon of foaming and bringing about the degradation of density and rigidity. The total amount of transition elements as reduced to oxides is more preferably in the range of 0.3–1 mass %. By having the total amount fall in this range, it is made possible to obtain a sintered body having sufficient blackness and abounding in density and rigidity.

As the transition elements which are usable in this invention, such transition (metal) elements as Cr, Mn, Fe, Co, Ni, and Cu prove most advantageous among other transition elements.

When the amount of $SiO_2$ decreases in the mass percentage composition, MgO—$Al_2O_3$—$SiO_2$, as the main component of the sintered body, the black color imparted to the sintered body is proportionately lightened. The $Li_2O$ included in the composition, while the composition is in the process of forming a sintered body, fixes a part of $SiO_2$ in the form of a $Li_2O$—$Al_2O_3O$—$SiO_2$ sintered body. When the percentage composition is considered, therefore, it requires subtraction of that part of the amount of $SiO_2$ from the $SiO_2$ amount. Empirically, it is inferred that the amount of $SiO_2$ so subtracted is approximately represented by $8\times Li_2O$. Accordingly, for the purpose of obtaining the black coloration contemplated by this invention, it is necessary to transform the mass ratio in the chemical composition to this composition ratio, $X=(SiO_2-8\times Li_2O)/MgO \geq 3.0$ and $Y=(SiO_2-8\times Li_2O)/Al_2O_3 \geq 1.2$, preferably $X=(SiO_2-8\times$ $Li_2O/MgO \geq 3.65$ and $Y=(SiO_2-8\times Li_2O)/Al_2O_3 \geq 1.3$. The mechanism responsible for imparting a fully satisfactory black tone to a sintered body in consequence of securing the composition ratio of $SiO_2$ as described above has not yet been fully elucidated. It may be logically explained, however, by a postulate that the condition of the deficiency of oxygen in the Si—O bond present in a crystal constitutes itself a factor of some sort or other.

For the sake of imparting a black tone to a given sintered body, the sintering atmosphere and the sintering temperature adopted for the sintered body form important factors. By the sintering operation in air which has been adopted in the ordinary sintering, the coloration attained at all is only in a light gray color or a blue color. Only by forming a sintered body in a non-oxidizing atmosphere at a temperature in the range of 1200–1500° C., it is made possible to have the produced sintered body to assume a black tone. As regards the mechanism responsible for the assumption of the black tone in such an atmosphere at such a temperature as specified above, it is inferred that the lack of oxygen likewise constitutes itself a factor of some sort or other.

For the sintering atmosphere, such a non-oxidizing gas as argon, helium, nitrogen, and hydrogen may be used. The sintering may be performed in a reducing atmosphere formed by having a hydrogen gas partly incorporated in such an inert gas as argon, which results in enhancing the impartation of a black tone.

As respects the sintering temperature, if it is less than 1200° C., the shortage would be at a disadvantage in rendering it difficult to obtain a fully densified sintered body and, even when the sintered body is densified at all, preventing this sintered body from thoroughly undergoing coloration in black. If the temperature exceeds 1500° C., the excess would be at a disadvantage in suffering the crystal phase of a produced sintered body to melt and disrupting any plan to obtain a normal sintered body on account of such phenomena as fusion and expansion. The sintering temperature is more preferably in the range of 1275° C.–1450° C.

Regarding the thermal expansion coefficient of the sintered body of this invention, the thermal expansion coefficient is required to be not more than $0.6\times10^{-6}/°$ C. in absolute value at room temperature in the light of the necessity for maintaining the dimensional accuracy and the stability needed in production units for the recent high integration semiconductors and miniaturized magnetic heads. The precision members which demand thermal stability of still higher accuracy are in need of thermal expansion coefficients approximating closely to zero expansion. The thermal expansion coefficient is preferred to be not more than $0.3\times10^{-6}/°$ C. (namely $-0.3$–$0.3 \, 10^{-6}/°$ C.) in absolute value at room temperature. Here, the minus numerical value in the thermal expansion coefficient means the fact that the relevant member shrinks as the temperature rises. In the narrow temperature range around room temperature, a sintered body having minus thermal expansion coefficient while having the composition conforming to this invention may be obtained.

Concerning the rigidity (Young's modulus) of a sintered body, in order for the sintered body to serve effectively as a precision structure within a fixed space, the rigidity is required to have a Young's modulus of not less than 100 GPa, optimally of not less than 120 GPa. If Young's modulus is less than 100 GPa, the shortage would be at a disadvantage in requiring the structure to increase in wall thickness and size with a view to repressing the deformation of the relevant member.

Where a given sintered body is to be used in such a partial supporting member as an end face supporting shaft, the specific rigidity (Young's modulus/specific gravity) must be also high in order for the sintered body to retain precision fully sufficient for a structure. In this invention, the specific rigidity is required to be not less than 40 GPa·cm³/g, preferably not less than 50 GPa·cm³/g.

In the sintered body of this invention, by being provided with a chemical composition mainly comprising 8.0–17.2 mass % of MgO, 22,0–38.0 mass % of $Al_2O_3$, 49.5–65.0 mass % of $SiO_2$, a crystal phase of the sintered body can be formed as a crystal phase made mainly of cordierite and the thermal expansion coefficient in absolute value at room temperature, the modulus of elasticity (Young's modulus), and the specific rigidity (Young's modulus/specific gravity) can be adjusted within the respective ranges contemplated by this invention. Though $Li_2O$ is not an essential component for the sintered body, the sintering properties may be enhanced and the impartation of a black tone may be promoted by the incorporation of $Li_2O$.

The chemical composition of MgO, $Al_2O_3$, and $SiO_2$ is so fixed as to fall in the percentage composition as mentioned above with a view to enabling the sintered body to acquire a crystal phase formed mainly of cordierite. If the proportions of MgO and $Al_2O_3$ are unduly large, the excess would be at a disadvantage in suffering the crystal phase of spinel, mullite, or forsterite to acquire an unduly large thermal expansion coefficient and the thermal expansion coefficient of the sintered body as a whole to exceed $0.6\times10^{-6}/°$ C. Conversely, if the proportions of MgO and $Al_2O_3$ are unduly small, the shortage would be at a disadvantage in unduly decreasing the crystal phase of cordierite. If the proportion of $SiO_2$ is unduly large, the excess would induce a decrease in the modulus of elasticity. If this proportion is unduly small, the shortage would unduly increase such crystal as spinel, mullite, or forsterite which has high thermal expansion coefficient.

The sintered body of this invention is enabled to be improved in the sintering properties by incorporating therein $Li_2O$ in addition to MgO, $Al_2O_3$, and $SiO_2$. This improvement results in facilitating the formation of a densified sintered body. The start of the activation of the reaction (mass transfer) in the sintered body from a relatively low temperature onward can bring about such effects as enabling the impartation of a black color to start at a low temperature and the finally obtained sintered body to assume a black tone to a greater extent. The addition of $Li_2O$ in any amount exceeding 2.5 mass % is unfavorable because the excess would bring about a conspicuous decrease in the modulus of elasticity. For the purpose of deriving expected effects from the addition of $Li_2O$, this compound is preferred to be added in an mount of not less than 0.1 mass %. By adjusting the amount of $Li_2O$ to be added in the range of 0.2–1.0 mass %, it is made possible to obtain a sintered body having such an extremely low thermal expansion coefficient as of not more than $0.1\times10^{-6}/°$ C. in absolute value.

In this invention, for the purpose of acquiring the satisfactory low thermal expansion coefficient and rigidity, the crystal phase of cordierite in the sintered body is preferred to account for not less than 80 vol. %, optically not less than 90 vol. %, of the whole volume of the sintered body. The expression "crystal phase of cordierite" as used in this invention means a crystal phase which comprises pure cordierite crystal plus a crystal phase which, on X ray diffraction, manifests a diffraction peak of cordierite and yet reveals a change in the lattice constant owing to a solid solution of Li and transition elements.

The crystal phase of the sintered body of this invention may be a single-phase crystal phase of cordierite or may additionally incorporate therein a $Li_2O$—$Al_2O_3$—$SiO_2$ type crystal phase (β-spodumene, eucriptite, petalite). Any crystal phase other than these crystal phases is preferred not to be contained in the sintered body from the viewpoint of acquiring a low thermal expansion coefficient, though the incorporation thereof can be tolerated when the content thereof is not more than 5 mass %.

Of the sintering method used for the production of the sintered body of this invention, such elements as the sintering atmosphere and the sintering temperature have been already described above.

The sintering method itself may be selected among a hot press method, a hot isostatic press (HIP) method, a gas pressure sintering method, and a normal pressure sintering method. The hot press method, the HIP method, and the gas pressure sintering method prove particularly favorable in a sense that they prevent low melting substances from foaming and enable the sintering process to perform at a higher temperature and they permit a sintered body to be formed within a percentage composition in which the normal pressure sintering method fails to produce required sintering. Economically, the normal pressure sintering method excels all the other methods enumerated above and can be applied to members complicate and large. Thus, the sintering method can be used as varied with the kind of application to be adopted.

Since the HIP method and the hot press method are capable of producing poreless materials (materials of specular surfaces), they can be applied to the production of materials for reflecting mirrors, fastener materials which abhor the deposition of dirt in pores, and transportation grade band members.

Since the sintered body of this invention is intended for such uses as cherish precision, it is not allowed to change size and geometric precision over time and to generate an outer gas. The sintered body, therefore, is required to have a dense texture. For this reason, the apparent porosity is required to be not more than 2%, preferably not more than 0.2%. Even for the sake of securing the rigidity contemplated by this invention, it is necessary that the apparent porosity be kept to a level of not more than 2%. By adopting the method for the production of the sintered body of this invention which has been described so far, it is made possible to adjust the apparent porosity at a value in the range of this invention specified above.

The following materials can be used as the raw material powder to be used for the production of the sintered body of this invention.

Electro-molten cordierite, synthetic cordierite, talc, magnesia, magnesium hydroxide, magnesium carbonate, and magnesia spinel are usable as MgO sources, silica is usable as a $SiO_2$ source, alumina is usable as an $Al_2O_3$ source, and kaolin and mullite are usable as an $Al_2O_3$—$SiO_2$ composite source.

The electro-molten cordierite and synthetic cordierite may function also as a $SiO_2$—$Al_2O_3$ source, the magnesia spinel may function also as an $Al_2O_3$ source, and the talc may function also as a $SiO_2$ source.

As the raw material for the MgO source, it is advantageous to supply not less than 70 mass % of the total MgO component of the sintered body with electro-molten cordierite, synthetic cordierite, or talc. When the proportion occupied by this raw material is set at not less than 70 mass % of the total MgO component, the impartation of a black color can be improved to a greater extent. Though the mechanism responsible for inducing this phenomenon has not been elucidated fully, it may be logically explained by a supposition that the difference in the crystal phase of the sintered body occurring from the intermediate phase through the terminal phase of the sintering process produces an influence.

Also from the standpoint of improving the yield of sintering of articles in a large shape or in a complicated shape, the use of the raw materials of electro-molten cordierite, synthetic cordierite, and talc prove advantageous.

As $Li_2O$ sources, lithium carbonate, lithium oxide, β-spodumene, eucriptite, and petalite powder can be used. From the viewpoint of improving sintering properties of products of a large shape and a complicate shape, the β-spodumene, eucriptite, and petalite powder are particularly suitable as raw material powders.

As transition element sources, oxides, hydroxides, nitrates, and carbonates of transition elements, and the metal powders thereof can be used.

EXAMPLE

Now, Examples (Nos. 1–16) of this invention will be described below in conjunction with Comparative Examples (Nos. 17–23).

As raw material powders, magnesia (average particle diameter 0.2 μm), talc (average particle diameter 5 μm), electro-molten cordierite (average particle diameter 3 μm), synthetic cordierite (average particle diameter 2.5 μm), magnesium hydroxide (average particle diameter 0.5 μm), magnesium carbonate (average particle diameter 1 μm), lithium carbonate (average particle diameter 2 μm), lithium oxide (average particle diameter 1 μm), β-spodumene (average particle diameter 5 μm), euriptite (average particle diameter 5 μm), petalite (average particle diameter 4 μm), silica (molten silica, average particle diameter 0.7 μm), alumina (average particle diameter 0.3 μm), kaolin (average particle diameter 2.5 μm), and mullite (average particle diameter 1 μm) were used. The synthetic cordierite was obtained by mixing magnesia, silica, and alumina powder at a ratio satisfying a theoretical composition of cordierite crystal ($2MgO \cdot 2Al_2O_3 \cdot 5SiO_2$), and allowing the components to react with one another at 1420° C. for 10 hours thereby transforming the mixture into a cordierite in a granular form. The granular cordierite was pulverized prior to use.

As the raw materials for the transition element sources, oxides, hydroxides, nitrates, carbonates, or metal powders of the relevant transition elements were used.

TABLE 1

| Example | | Chemical composition (mass %) | | | | | | | |
|---|---|---|---|---|---|---|---|---|---|
| No. | Raw material powder to used | MgO | $Al_2O_3$ | $SiO_2$ | $Li_2O$ | X(*1) | Y(*2) | Coloring auxiliary (*3) | |
| 1 | Talc · petalite | 13.1 | 35.0 | 51.1 | 0.3 | 3.71 | 1.38 | $Fe_2O_3$ | 0.3% |
|   | Mullite · silica |   |   |   |   |   |   | CoO | 0.2% |

TABLE 1-continued

| Example No. | Raw material powder to used | Chemical composition (mass %) | | | | | | Coloring auxiliary (*3) | |
|---|---|---|---|---|---|---|---|---|---|
| | | MgO | $Al_2O_3$ | $SiO_2$ | $Li_2O$ | X(*1) | Y(*2) | | |
| 2 | Electro-molten cordierite · silica Euciptite · mullite | 9.8 | 28.4 | 60.4 | 0.6 | 5.67 | 1.96 | $Fe_2O_3$ $Cr_2O_3$ | 0.6% 0.2% |
| 3 | Talc · β-spodumene Kaolin · alumina | 10.6 | 36.2 | 52.4 | 0.1 | 4.87 | 1.43 | $Fe_2O_3$ | 0.7% |
| 4 | Electro-molten cordierite · silica petalite · alumina | 12.6 | 32.3 | 54.5 | 0.4 | 4.07 | 1.59 | $Fe_3O_4$ | 0.2% |
| 5 | Talc · kaolin · alumina Lithium carbonate · silica | 15.8 | 22.4 | 60.8 | 0.2 | 3.72 | 2.64 | Nickel nitrate $Cr_2O_3$ | 0.4% 0.3% |
| 6 | Synthetic cordierite · silica Lithium hydroxide · mullite | 9.8 | 29.5 | 57.5 | 2.0 | 4.23 | 1.41 | $Fe_2O_3$ $Cr_2O_3$ | 1.0% 0.2% |
| 7 | Talc · β-spodumene Alumina · silica · magnesia | 11.5 | 33.4 | 54.2 | 0.7 | 4.23 | 1.46 | $Fe_2O_3$ | 0.2% |
| 8 | Electro-molten cordierite · silica petalite · alumina | 8.2 | 29.7 | 60.2 | 1.4 | 5.98 | 1.65 | Copper oxide 0.3% Manganese carbonate | 0.2% |
| 9 | Electro-molten cordierite · silica Euciptite · mullite | 11.3 | 30.3 | 57.9 | 0.2 | 4.98 | 1.86 | $Cr_2O_3$ | 0.3% |
| 10 | Talc · petalite · silica Magnesium hydroxide · alumina | 13.0 | 33.4 | 51.7 | 0.4 | 3.73 | 1.45 | $Fe_2O_3$ CoO | 1.0% 0.5% |
| 11 | Electro-molten cordierite · silica β-spodumene · alumina | 12.3 | 33.0 | 53.7 | 0.6 | 3.98 | 1.48 | $Fe_2O_3$ | 0.4% |
| 12 | Talc · magnesia Lithium · silica · kaolin | 13.8 | 24.2 | 60.2 | 0.8 | 3.90 | 2.22 | $Fe_2O_3$ $Cr_2O_3$ | 0.7% 0.3% |
| 13 | Electro-molten cordierite · silica Lithium oxide · alumina | 15.2 | 32.0 | 51.9 | 0.1 | 3.36 | 1.60 | $Fe_2O_3$ | 0.8% |
| 14 | Talc · β-spodumene Alumina · silica | 9.9 | 30.1 | 58.4 | 1.0 | 5.09 | 1.67 | $Fe_2O_3$ Niobium oxide | 0.3% 0.3% |
| 15 | Synthetic cordierite · silica β-spodumene · alumina | 8.5 | 28.9 | 60.4 | 1.2 | 5.98 | 1.76 | $Fe_3O_4$ | 1.0% |
| 16 | Electro-molten cordierite · silica Alumina · magnesium hydroxide | 10.7 | 34.5 | 54.3 | 0.0 | 5.07 | 1.57 | Fe $Cr_2O_3$ | 0.2% 0.3% |
| 17 | Talc · alumina · silica β-spodumene mullite | 14.8 | 36.2 | 48.2 | 0.5 | 2.99 | 1.22 | $Fe_2O_3$ | 0.3% |
| 8 | Electro-molten cordierite · talc Silica · lithium oxide · alumina | 18.5 | 26.3 | 54.3 | 0.2 | 2.85 | 2.00 | $Fe_2O_3$ | 0.7% |
| 9 | Talc · kaolin · silica Lithium oxide · alumina | 16.4 | 20.9 | 61.8 | 0.1 | 3.72 | 2.92 | Copper oxide $Cr_2O_3$ | 0.5% 0.7% |
| 10 | Electro-molten cordierite · silica Lithium oxide · mullite | 12.5 | 34.8 | 52.3 | 0.4 | 3.93 | 1.41 | None | |
| 11 | Synthetic cordierite · silica β-spodumene · alumina | 8.5 | 28.9 | 60.4 | 1.2 | 5.98 | 1.76 | $Fe_2O_3$ | 1.0% |
| 12 | Talc · petalite Lithium carbonate · alumina | 9.3 | 31.8 | 56.5 | 2.4 | 4.01 | 1.17 | None | |
| 13 | Talc · kaolin β-spodumene | 5.7 | 30.6 | 58.4 | 5.3 | 2.81 | 0.52 | None | |

*1 X = ($SiO_2$ − 8 × $Li_2O$)/MgO (mass ratio)
*2 Y = ($SiO_2$ − 8 × $Li_2O$)/$Al_2O_3$ (mass ratio)
*3 The amount of a given coloring auxiliary is expressed in mass % as reduced to the relevant oxide.

TABLE 2

| Example No. | Sintering method Sintering temperature | Gas for atmosphere (*1) | Thermal expansion coefficient at room temperature $10^{-6}$/° C. | Apparent porosity % | Young's modulus GPa | Specific rigidity GPa · cm$^3$/g | Total reflectivity % | Cordierite crystal phase ratio % |
|---|---|---|---|---|---|---|---|---|
| 1 | Hot press, 1420° C. | Argon + hydrogen 5% | 0.14 | 0 | 141 | 52.2 | 9.8 | 100 |
| 2 | Gas pressure, 1400° C. | Argon | 0.11 | 0 | 112 | 48.2 | 11.2 | 100 |
| 3 | HIP, 1375° C. | Argon | 0.21 | 0 | 157 | 58.8 | 9.2 | 96 |
| 4 | Normal pressure, 1370° C. | Argon | 0.01 | 0.1 | 134 | 54.2 | 11.8 | 100 |
| 5 | Hot press, 1420° C. | Argon + hydrogen 5% | 0.35 | 0 | 121 | 51.5 | 14.5 | 91 |
| 6 | Gas pressure, 1420° C. | Argon | −0.09 | 0 | 120 | 46.5 | 15.2 | 96 |
| 7 | Normal pressure, 1390° C. | Argon + hydrogen 5% | 0.14 | 0.2 | 129 | 50.6 | 12.2 | 100 |
| 8 | Gas pressure, 1290° C. | Argon | −0.18 | 0 | 108 | 48.0 | 15.2 | 97 |
| 9 | Normal pressure, 1385° C. | Helium | 0.04 | 0.1 | 147 | 59.8 | 11.2 | 100 |

TABLE 2-continued

| Example No. | Sintering method Sintering temperature | Gas for atmosphere (*1) | Thermal expansion coefficient at room temperature $10^{-6}/°C$ | Apparent porosity % | Young's modulus GPa | Specific rigidity GPa·cm³/g | Total reflectivity % | Cordierite crystal phase ratio % |
|---|---|---|---|---|---|---|---|---|
| 10 | Hot press, 1420° C. | Argon + hydrogen 5% | 0.05 | 0 | 138 | 53.2 | 8.9 | 100 |
| 11 | Normal pressure, 1350° C. | Argon | −0.01 | 0.1 | 128 | 54.4 | 10.9 | 100 |
| 12 | Hot press, 1320° C. | Argon + hydrogen 5% | 0.28 | 0 | 118 | 49.8 | 9.7 | 97 |
| 13 | Gas pressure, 1450° C. | Argon | 0.52 | 0 | 185 | 68.5 | 10.2 | 86 |
| 14 | Hot press, 1250° C. | Argon | 0.18 | 0 | 121 | 50.0 | 16.1 | 100 |
| 15 | Normal pressure, 1300° C. | Argon + hydrogen 5% | 0.25 | 0.1 | 120 | 52.0 | 7.9 | 98 |
| 16 | Hot press, 1420° C. | Argon + hydrogen 5% | 0.29 | 0 | 151 | 56.5 | 14.6 | 100 |
| 17 | Hot press, 1400° C. | Argon + hydrogen 5% | 1.95 | 0 | 141 | 50.2 | 38.2 | 89 |
| 18 | Gas pressure, 1450° C. | Argon | 1.42 | 0 | 145 | 55.0 | 19.3 | 76 |
| 19 | Normal Pressure 1300° C. | Argon | 0.98 | 0.4 | 82 | 40.0 | 18.5 | 72 |
| 20 | Normal pressure 1390° C. | Argon | 0.15 | 0.1 | 117 | 46.6 | 29.7 | 97 |
| 21 | Normal pressure 1180° C. | Argon + hydrogen 5% | 0.42 | 5.1 | 72 | 36.2 | 43.5 | 54 |
| 22 | Normal pressure 1370° C. | Air | 0.52 | 0.9 | 88 | 39.0 | 80.2 | 55 |
| 23 | Normal pressure 1280° C. | Air | 0.60 | 2.8 | 65 | 32.0 | 74.6 | 46 |

*1 + hydrogen 5%: Add a hydrogen gas until a concentration thereof reaches 5 vol. % in the ambient gas.

As shown in Table 1, the samples of Example Nos. 1–16 and Comparative Example Nos. 17–23 were obtained by combining the relevant raw material powders in such proportions as form the chemical compositions shown in Table 1, adding 3 mass parts of a resin binder to each of the resultant mixtures, and mixing the produced blends each with water as a solvent in an alumina pot mill for 24 hours. The resultant slurries were each dried and granulated and then formed in a prescribed shape under static pressure of 1500 kg/cm² (147 MPa). The formed product was heated in air to 500° C. to degrease the resin binder.

The degreased formed product was sintered by a sintering method, in a sintering atmosphere, at a sintering temperature mentioned in Table 2. The sintering was performed under a surface pressure of 400 MPa by the hot press method, under a gas pressure of 50 kg/cm² (5 MPa) by the gas pressure sintering method, and under 1500 atmospheres at 1300° C. after the step of normal pressure sintering by the HIP method. The sintering times each at a relevant temperature indicated in the tables were 4 hours in the normal pressure sintering and the gas pressure sintering, and 1 hour in the hot press sintering method and the HIP sintering method.

The produced sintered bodies were each tested for thermal expansion coefficient at room temperature, total reflectivity, apparent porosity, Young's modulus, and cordierite crystal phase ratio. The results are shown in Table 2. The total reflectivity was determined in accordance with JIS K7105. Since the thermal expansion coefficient at room temperature requires accurate determination, the determination was carried out in accordance with JIS R3251 (dual light path Michelson's laser interference method) for the use in the determination of a thermal expansion coefficient of a low thermal expansion glass. The apparent porosity was determined by the Archimedes method. The cordierite crystal phase ratio was determined by the X-ray diffraction, on the condition that the crystal phase comprising pure cordierite crystals and a crystal phase having a lattice constant altered by a solid solution of Li and a transition element while possessing a diffraction peak of cordierite calculated was reckoned as a cordierite crystal phase.

Experiment Nos. 1–16 represented working examples of this invention, which invariably produced satisfactory results.

Experiment Nos. 17–23 represented comparative examples.

The sample of No. 17 showed thermal expansion coefficient and total reflectivity both outside the respective ranges contemplated by the invention because the $SiO_2$ composition and the ratio X thereof both deviated from the ranges of this invention.

The sample of No. 18 showed thermal expansion coefficient, total reflectivity, and cordierite crystal phase ratio all outside the respective ranges contemplated by the invention because the MgO composition and the ratio X both deviated from the ranges of this invention.

The sample of No. 19 showed thermal expansion coefficient, Young's modulus, total reflectivity, and cordierite crystal phase ratio all outside the respective ranges contemplated by this invention because the $Al_2O_3$ composition deviated from the range of this invention.

The sample of No. 20 showed total reflectivity outside the relevant range contemplated by this invention because it had no transition elements added.

The sample of No. 21 showed apparent porosity, Young's modulus, specific rigidity, total reflectivity, and cordierite crystal phase ratio invariably outside the respective ranges contemplated by this invention because the sintering temperature was below the lower limit specified by this invention.

The sample of No. 22 showed the ratio Y outside the range fixed by this invention and was sintered in air without any addition of a transition element. Specifically, the method disclosed in the publication of JP-A-61-72,679 was performed on this sample. As a result, this sample showed total reflectivity widely deviating from the range fixed by this invention and Young's modulus, specific rigidity, and cordierite crystal phase ratio also falling outside the respective ranges contemplated by this invention.

The sample of No. 23 showed MgO and $Li_2O$ compositions and ratios X and Y outside the respective ranges fixed by this invention and was sintered in air without adding any transition element. Specifically, the method disclosed in the publication of JP-A-10-53,460 was performed on this sample. As a result, the total reflectivity of the sample widely deviated from the range fixed by this invention and apparent porosity, Young's modulus, specific rigidity, and cordierite crystal phase ratio thereof were outside the respective ranges contemplated by this invention.

INDUSTRIAL APPLICABILITY OF THE INVENTION

By this invention, it is made possible to realize a black low thermal expansion ceramic sintered body having a black tone, manifesting very low thermal expansion at room temperature, and abounding in rigidity and specific rigidity and a method for the production thereof. For the first time, therefore, this invention has materialized the qualities that have been demanded by such members requiring a black tone in devices using laser beam and ultraiviolet light while securing dimensional accuracy and stability necessary for the production units for recent highly integrated semiconductors and miniaturized magnetic heads.

What is claimed is:

1. A method for the production of a black low thermal expansion high specific rigidity ceramic sintered body, comprising:
   forming the sintered body in an atmosphere of a non-oxidizing gas at a temperature in the range of 1200–1500° C.,
   said black low thermal expansion high specific rigidity ceramic sintered body, comprising:
   having a thermal expansion coefficient of not more than $0.6 \times 10^{-6}/°$ C. in absolute value at room temperature,
   a modulus of elasticity (Young's modulus) of not less than 100 GPa,
   a specific rigidity (Young's modulus/specific gravity) of not less than 40 GPa·cm³/g, and
   assuming a black tone,
   said black low thermal expansion high specific rigidity ceramic sintered body having a chemical composition comprising:
   8.0–17.2 mass % of MgO,
   22.0–38.0 mass % of $Al_2O_3$,
   49.5–65.0 mass % of $SiO_2$,
   a total of 0.1–2 mass % of one or more transition elements as reduced to oxides,
   0–2.5 mass % of $Li_2O$, and
   having the mass ratios satisfy the relationships of $(SiO_2 - 8 \times Li_2O)/MgO \geq 3.0$ and $(SiO_2 - 8 \times Li_2O)/Al_2O_3 \geq 1.2$.

2. A black low thermal expansion high specific rigidity ceramic sintered body, comprising:
   having a thermal expansion coefficient of not more than $0.6 \times 10^{-6}/°$ C. in absolute value at room temperature,
   a modulus of elasticity (Young's modulus) of not less than 100 GPa,
   a specific rigidity (Young's modulus/specific gravity) of not less than 40 GPa·cm³/g, and
   assuming a black tone.

3. A black low thermal expansion high specific rigidity ceramic sintered body according to claim 2,
   wherein the total reflectivity of the sintered body is not more than 17% at a wavelength of light in the range of 200–950 nm.

4. A black low thermal expansion high specific rigidity ceramic sintered body according to claim 2,
   wherein the apparent porosity of the sintered body is not more than 2%.

5. A black low thermal expansion high specific rigidity ceramic sintered body according to claim 2,
   wherein not less than 80 vol. % of the crystal phase of the sintered body is a crystal phase of cordierite.

6. A black low thermal expansion high specific rigidity ceramic sintered body according to claim 2,
   wherein the thermal expansion coefficient is not more than $0.3 \times 10^{-6}/°$ C. in absolute value at room temperature.

7. A black low thermal expansion high specific rigidity ceramic sintered body according to claim 2,
   wherein the modulus of elasticity is not less than 120 GPa and the specific rigidity is not less than 50 GPa·cm³/g.

8. A black low thermal expansion high specific rigidity ceramic sintered body, comprising:
   having a thermal expansion coefficient of not more than $0.6 \times 10^{-6}/°$ C. in absolute value at room temperature,
   a modulus of elasticity (Young's modulus) of not less than 100 GPa,
   a specific rigidity (Young's modulus/specific gravity) of not less than 40 GPa·cm³/g, and
   assuming a black tone,
   said black low thermal expansion high specific rigidity ceramic sintered body having a chemical composition comprising:
   8.0–17.2 mass % of MgO,
   22.0–38.0 mass % of $Al_2O_3$,
   49.5–65.0 mass % of $SiO_2$,
   a total of 0.1–2 mass % of one or more transition elements as reduced to oxides,
   0–2.5 mass % of $Li_2O$, and
   having the mass ratios satisfy the relationships of $(SiO_2 - 8 \times Li_2O)/MgO \geq 3.0$ and $(SiO_2 - 8 \times Li_2O)/Al_2O_3 \geq 1.2$.

* * * * *